(12) United States Patent
Yadav

(10) Patent No.: US 7,683,098 B2
(45) Date of Patent: Mar. 23, 2010

(54) MANUFACTURING METHODS FOR NANOMATERIAL DISPERSIONS AND PRODUCTS THEREOF

(75) Inventor: Tapesh Yadav, Longmont, CO (US)

(73) Assignee: PPG Industries Ohio, Inc., Cleveland, OH (US)

(*) Notice: Subject to any disclaimer, the term of this patent is extended or adjusted under 35 U.S.C. 154(b) by 1092 days.

(21) Appl. No.: 11/157,164

(22) Filed: Jun. 21, 2005

(65) Prior Publication Data

US 2006/0016371 A1    Jan. 26, 2006

Related U.S. Application Data

(60) Continuation-in-part of application No. 09/790,036, filed on Feb. 20, 2001, now Pat. No. 6,933,331, and a continuation-in-part of application No. PCT/US03/37635, filed on Nov. 25, 2003, and a continuation-in-part of application No. 10/441,683, filed on May 20, 2003, now abandoned, which is a division of application No. 09/790,036, filed on Feb. 20, 2001, now Pat. No. 6,933,331, which is a division of application No. 09/083,893, filed on May 22, 1998, now Pat. No. 6,228,904, and a continuation-in-part of application No. 08/739,257, filed on Oct. 30, 1996, now Pat. No. 5,905,000, which is a continuation-in-part of application No. 08/730,661, filed on Oct. 11, 1996, now Pat. No. 5,952,040, which is a continuation-in-part of application No. 08/706,819, filed on Sep. 3, 1996, now Pat. No. 5,851,507, and a continuation-in-part of application No. 08/707,341, filed on Sep. 3, 1996, now Pat. No. 5,788,738.

(60) Provisional application No. 60/581,612, filed on Jun. 21, 2004, provisional application No. 60/049,077, filed on Jun. 9, 1997, provisional application No. 60/069,936, filed on Dec. 17, 1997, provisional application No. 60/079,225, filed on Mar. 24, 1998.

(51) Int. Cl.
*B01F 3/12* (2006.01)
*B01F 3/08* (2006.01)
*C01B 33/14* (2006.01)
*C09K 3/00* (2006.01)
*C04B 14/00* (2006.01)

(52) U.S. Cl. ............... 516/34; 516/33; 516/35; 516/36; 516/78; 516/79; 516/80; 516/81; 516/90; 516/91; 516/93; 516/95; 516/96; 516/97; 516/99; 516/922; 516/924; 516/928; 516/929; 516/930; 516/931

(58) Field of Classification Search .......... 516/34, 516/78
See application file for complete search history.

(56) References Cited

U.S. PATENT DOCUMENTS

| | | | | |
|---|---|---|---|---|
| 2,613,160 | A * | 10/1952 | Walton et al. | 106/218 |
| 4,294,808 | A * | 10/1981 | Wasel-Nielen et al. | 423/305 |
| 5,122,298 | A | 6/1992 | Fry, Jr. et al. | 252/305 |
| 5,788,738 | A | 8/1998 | Pirzada | |
| 5,851,507 | A | 12/1998 | Pirzada | |
| 5,916,544 | A * | 6/1999 | Liu et al. | 424/59 |

(Continued)

Primary Examiner—Joseph D Anthony
(74) Attorney, Agent, or Firm—Donald R. Palladino

(57) ABSTRACT

Methods for manufacturing nanomaterial dispersions, such as nanomaterial concentrates, and related nanotechnology are provided. The nanomaterial concentrates provided can be more cheaply stored and transported compared to non-concentrate nanomaterial forms.

16 Claims, 1 Drawing Sheet

U.S. PATENT DOCUMENTS

| | | | |
|---|---|---|---|
| 5,984,997 | A | 11/1999 | Bickmore |
| 6,569,397 | B1 | 5/2003 | Yadav et al. |
| 6,599,627 | B2 | 7/2003 | Yeo et al. ............... 428/402.21 |
| 6,832,735 | B2 | 12/2004 | Yadav |
| 7,192,986 | B2 * | 3/2007 | Koyanagi et al. ............. 516/34 |
| 7,282,272 | B2 * | 10/2007 | Jones et al. ................. 428/500 |
| 7,297,731 | B2 * | 11/2007 | Walker et al. ............... 523/212 |
| 2001/0045063 | A1 * | 11/2001 | Kambe et al. ................. 51/308 |
| 2002/0006470 | A1 * | 1/2002 | Eberspacher et al. ........ 427/216 |
| 2002/0149002 | A1 * | 10/2002 | Womelsdorf et al. ..... 252/363.5 |
| 2003/0032679 | A1 * | 2/2003 | Cayton et al. ................. 516/33 |
| 2003/0082237 | A1 | 5/2003 | Cha et al. .................... 424/490 |
| 2003/0082437 | A1 * | 5/2003 | Sotomura .................... 429/111 |
| 2003/0165680 | A1 * | 9/2003 | Brady et al. ................. 428/402 |
| 2003/0172845 | A1 * | 9/2003 | Marx et al. .................. 106/425 |
| 2003/0193037 | A1 * | 10/2003 | Koyanagi et al. ............... 252/1 |
| 2003/0218258 | A1 | 11/2003 | Charles et al. .............. 257/783 |
| 2003/0228271 | A1 * | 12/2003 | Batz-Sohn et al. ........ 424/70.23 |
| 2003/0229172 | A1 * | 12/2003 | Batz-Sohn et al. .......... 524/430 |
| 2004/0241085 | A1 * | 12/2004 | Marx et al. .................. 423/622 |
| 2005/0200278 | A1 * | 9/2005 | Jones et al. .................. 313/582 |
| 2005/0226808 | A1 * | 10/2005 | Gondal et al. ............. 423/648.1 |
| 2009/0116100 | A1 * | 5/2009 | Ota et al. .................... 359/358 |

* cited by examiner

MANUFACTURING METHODS FOR NANOMATERIAL DISPERSIONS AND PRODUCTS THEREOF

CROSS-REFERENCE TO RELATED PATENT APPLICATIONS

The present application claims benefit of provisional application No. 60/581,612 filed Jun. 21, 2004, which application is hereby incorporated by reference in its entirety. This application is a continuation-in-part of U.S. patent application Ser. No. 09/790,036 filed on Feb. 20, 2001 now U.S. Pat. No. 6,933,331, and is a continuation-in-part of PCT patent application US03/37635 filed on Nov. 25, 2003, both of which are herein incorporated by reference. This application is also a continuation-in-part of U.S. patent application Ser. No. 10/441,683 filed on May 20, 2003 now abandoned which is a divisional of U.S. patent application Ser. No. 09/790,036 filed on Feb. 20, 2001 now U.S. Pat. No. 6,933,331 which is a divisional of application Ser. No. 09/083,893 now U.S. Pat. No. 6,228,904 filed on May 22, 1998, which is incorporated herein by reference and which claims the benefit of U.S. Provisional application 60/049,077 filed on Jun. 9, 1997, 60/069,936 filed on Dec. 17, 1997, and 60/079,225 filed on Mar. 24, 1998. U.S. Pat. No. 6,228,904 is a continuation-in-part of U.S. patent application Ser. No. 08/739,257, filed Oct. 30, 1996, now U.S. Pat. No. 5,905,000, which is a continuation-in-part of U.S. Ser. No. 08/730,661, filed Oct. 11, 1996 now U.S. Pat. No. 5,952,040, which is a continuation-in-part of U.S. Ser. No. 08/706,819, filed Sep. 3, 1996, now U.S. Pat. No. 5,851,507 and U.S. Ser. No. 08/707,341, filed Sep. 3, 1996, now U.S. Pat. No. 5,788,738.

FIELD OF THE INVENTION

The present invention relates to methods of manufacturing dispersions of submicron and nanoscale powders.

RELEVANT BACKGROUND

Powders are used in numerous applications. They are the building blocks of electronic, telecommunication, electrical, magnetic, structural, optical, biomedical, chemical, thermal, and consumer goods. On-going market demands for smaller, faster, superior and more portable products have demanded miniaturization of numerous devices. This, in turn, demands miniaturization of the building blocks, i.e. the powders. Submicron and nano-engineered (or nanoscale, nanosize, ultrafine) powders, with a size 10 to 100 times smaller than conventional micron size powders, enable quality improvement and differentiation of product characteristics at scales currently unachievable by commercially available micron-sized powders.

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, are an extraordinary opportunity for design, development and commercialization of a wide range of devices and products for various applications. Furthermore, since they represent a whole new family of material precursors where conventional coarse-grain physiochemical mechanisms are not applicable, these materials offer a unique combination of properties that can enable novel and multifunctional components of unmatched performance. Yadav et al. in a co-pending and commonly assigned U.S. patent application Ser. No. 09/638,977, which along with the references contained therein, is hereby incorporated by reference in full, teaches some applications of sub-micron and nanoscale powders.

Some of the challenges in the cost-effective production of powders involve controlling the size of the powders as well as controlling other characteristics such as the shape, distribution, the composition of the powder, etc. Innovations are desired in these regard.

SUMMARY OF THE INVENTION

Briefly stated, the present invention provides methods for manufacturing nanoscale powders comprising a desired metal and applications thereof.

In some embodiments, the present invention provides dispersions of nanoparticles comprising doped or undoped metal oxides.

In some embodiments, the present invention provides composites and coatings that comprise doped or undoped metal oxides.

In some embodiments, the present invention provides applications of dispersions of powders comprising doped or undoped metal oxides.

In some embodiments, the present invention provides methods for producing dispersions of novel nanoscale powders comprising metals in high volume, low-cost, and reproducible quality with control of various powder and dispersion characteristics.

In some embodiments, the present invention provides methods for producing dispersions of novel nanoscale powders comprising metals in high volume, low-cost, and reproducible quality with control of various powder and dispersion characteristics.

DETAILED DESCRIPTION OF THE PREFERRED EMBODIMENTS

Figure 1:
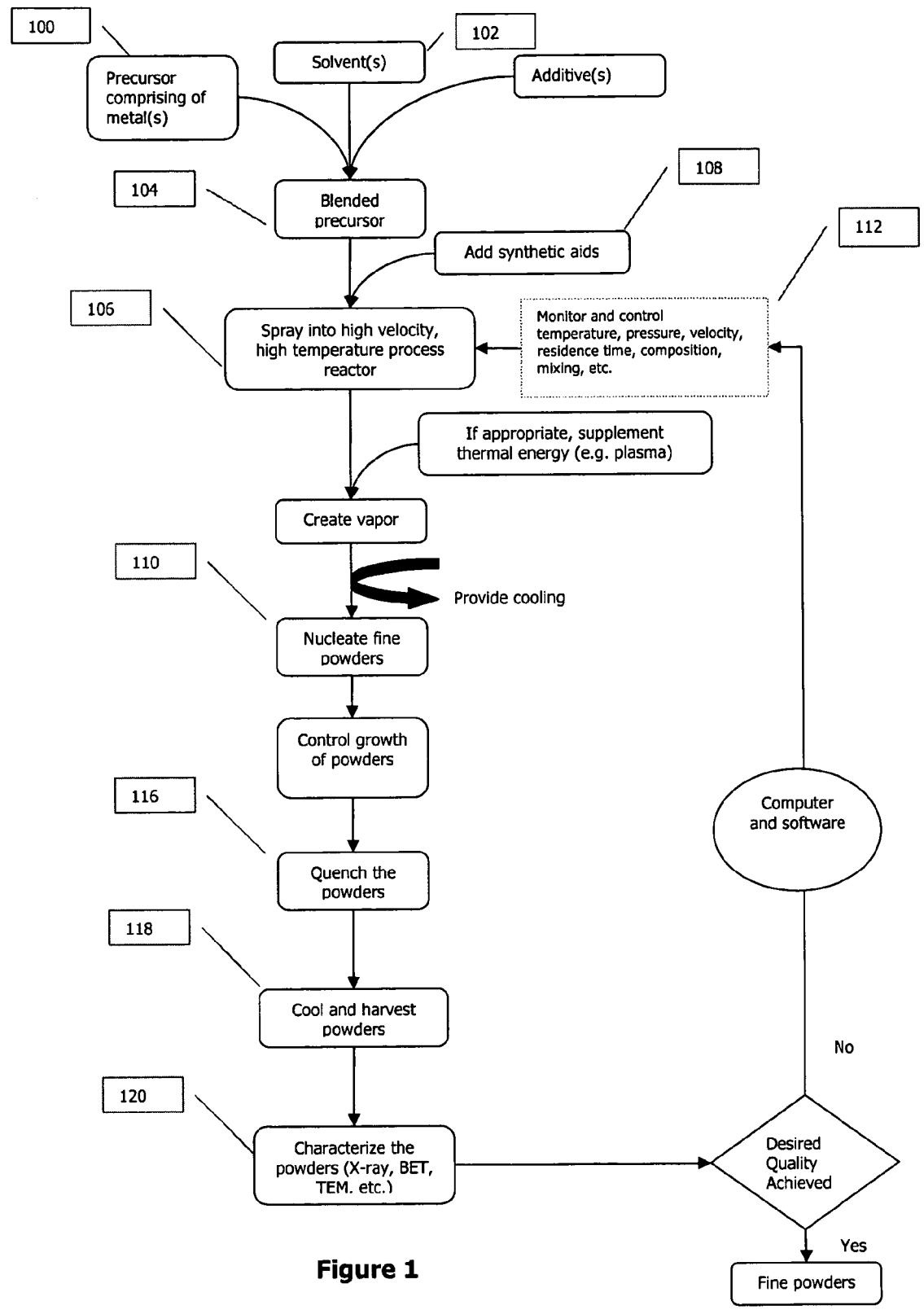
FIG. 1 shows an exemplary overall approach for producing submicron and nanoscale powders in accordance with the present invention.

This invention is generally directed to very fine inorganic powders. The scope of the teachings includes high purity powders. Powders discussed herein are of mean crystallite size less than 1 micron, and in certain embodiments less than 100 nanometers. Methods for producing and utilizing such powders in high volume, low-cost, and reproducible quality are also provided.

Definitions

For purposes of clarity the following definitions are provided to aid the understanding of the description and specific examples provided herein. Whenever a range of values are provided for a specific variable, both the upper and lower limit of the range are included within the definition.

"Fine powders" as used herein, refers to powders that simultaneously satisfy the following criteria:
(1) particles with mean size less than 10 microns; and
(2) particles with aspect ratio between 1 and 1,000,000.

For example, in some embodiments, the fine powders are powders that have particles with a mean domain size less than 5 microns and with an aspect ratio ranging from 1 to 1,000,000.

"Submicron powders" as used herein, refers to fine powders with a mean size less than 1 micron. For example, in some embodiments, the submicron powders are powders that have particles with a mean domain size less than 500 nanometers and with an aspect ratio ranging from 1 to 1,000,000.

The terms "nanopowders," "nanosize powders," "nanoparticles," and "nanoscale powders" are used interchangeably and refer to fine powders that have a mean size less than 250 nanometers. For example, in some embodiments, the nanopowders are powders that have particles with a mean domain size less than 100 nanometers and with an aspect ratio ranging from 1 to 1,000,000.

Pure powders, as the term used herein, are powders that have composition purity of at least 99.9% by metal basis. For example, in some embodiments the purity is 99.99%.

Nanomaterials, as the term used herein, are materials in any dimensional form (zero, one, two, three) and domain size less than 100 nanometers.

"Domain size," as that term is used herein, refers to the minimum dimension of a particular material morphology. In the case of powders, the domain size is the grain size. In the case of whiskers and fibers, the domain size is the diameter. In the case of plates and films, the domain size is the thickness.

The terms "powder," "particle," and "grain" are used interchangeably and encompass oxides, carbides, nitrides, borides, chalcogenides, halides, metals, intermetallics, ceramics, polymers, alloys, and combinations thereof. These terms include single metal, multi-metal, and complex compositions. These terms further include hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric forms or substances. Further, the term powder in its generic sense includes one-dimensional materials (fibers, tubes, etc.), two-dimensional materials (platelets, films, laminates, planar, etc.), and three-dimensional materials (spheres, cones, ovals, cylindrical, cubes, monoclinic, parallelolipids, dumbbells, hexagonal, truncated dodecahedron, irregular shaped structures, etc.). The term metal used above includes any alkali metal, alkaline earth metal, rare earth metal, transition metal, semi-metal (metalloids), precious metal, heavy metal, radioactive metal, isotopes, amphoteric element, electropositive element, cation forming element, and includes any current or future discovered element in the periodic table.

"Aspect ratio," as the term is used herein, refers to the ratio of the maximum to the minimum dimension of a particle.

"Precursor," as the term is used herein, encompasses any raw substance that can be transformed into a powder of same or different composition. In certain embodiments, the precursor is a liquid. The term precursor includes, but is not limited to, organometallics, organics, inorganics, solutions, dispersions, melts, sols, gels, emulsions, or mixtures.

"Powder," as the term is used herein, encompasses oxides, carbides, nitrides, chalcogenides, metals, alloys, and combinations thereof. The term includes hollow, dense, porous, semi-porous, coated, uncoated, layered, laminated, simple, complex, dendritic, inorganic, organic, elemental, non-elemental, dispersed, composite, doped, undoped, spherical, non-spherical, surface functionalized, surface non-functionalized, stoichiometric, and non-stoichiometric forms or substances.

"Coating" (or "film" or "laminate" or "layer"), as the term is used herein, encompasses any deposition comprising submicron and nanoscale powders. The term includes in its scope a substrate, surface, deposition, or a combination thereof having a hollow, dense, porous, semi-porous, coated, uncoated, simple, complex, dendritic, inorganic, organic, composite, doped, undoped, uniform, non-uniform, surface functionalized, surface non-functionalized, thin, thick, pre-treated, post-treated, stoichiometric, or non-stoichiometric form or morphology.

"Dispersion," as the term is used herein, encompasses inks, pastes, creams, lotions, suspension, Newtonian, non-Newtonian, uniform, non-uniform, transparent, translucent, opaque, white, black, colored, emulsified, organic, inorganic, polymeric, with additives, without additives, molten substance-based, water-based, polar solvent-based, or non-polar solvent-based compositions of matter comprising fine powders in any fluid or fluid-like state of substance. For purposes herein, a dispersion comprises at least one solid phase and at least one fluid or fluid-like phase, wherein the fluid or fluid like phase exhibits a viscosity that is less than 10,000 Pa.sec at any temperature between 0 K to 2275 K. Non-limiting illustrations of fluid or fluid-like phases included within the scope are organic solvents, inorganic solvents, polymeric solvents, aqueous solvents, oxygen comprising compositions, chalcogenides comprising compositions, boron comprising compositions, phosphorus comprising compositions, halogen comprising compositions, nitrogen comprising compositions, metal comprising compositions, carbon comprising compositions, molten metals and alloys, molten salts, supercritical fluids, liquids, oils, or gels which are synthetic or derived from nature such as agriculture, fishes, trees, fruits, seeds, flora, or fauna; the fluid or fluid-like phases includes water, acids, alkalis, organic melts, monomers, polymers, oligomers, biological fluids, ethers, esters, aromatics, alkanes, alkenes, alkynes, alcohols, aldehydes, ketones, carboxylic acids, organometallics, terpenols, acetates, sulfonic acids, emulsions, mixture of two or more liquid compositions, solutions, and the like.

This invention is directed to submicron and nanoscale powders comprising doped or undoped metal oxides, in certain embodiments. Given the relative abundance of metal in the earth's crust and current limitations on purification technologies, it is expected that many commercially produced materials would have naturally occurring metal impurities. These impurities are expected to be below 100 parts per million and in most cases in concentrations similar to other elemental impurities. Removal of such impurities does not materially affect the properties of interest to an application. For the purposes herein, powders comprising metal impurities wherein the impure metal is present in a concentration similar to other elemental impurities are excluded from the scope of this invention. However, it is emphasized that in one or more doped or undoped compositions of matter, certain metal may be intentionally engineered as a dopant into a powder at concentrations of 100 ppm or less, and these are included in the scope of this invention.

In a generic sense, the invention provides dispersions of nanoscale powders, and in a more generic sense, submicron powders comprising at least 100 ppm by weight, in some embodiments greater than 1 weight % by metal basis, and in other embodiments greater than 10 weight % by metal basis of at least one metal. Even though methods for preparing fine powders are illustrated herein, the teachings herein relating to manufacturing dispersions and concentrates can be applied to fine powders and nanomaterials produced by any method.

FIG. 1 shows an exemplary overall approach for the production of submicron powders in general and nanopowders in particular. The process shown in FIG. 1 begins with a metal containing raw material (for example, but not limited to, coarse oxide powders, metal powders, salts, slurries, waste products, organic compounds, or inorganic compounds). FIG. 1 shows one embodiment of a system for producing nanoscale and submicron powders in accordance with the present invention.

The process shown in FIG. 1 begins at 100 with a metal-containing precursor such as an emulsion, fluid, particle-containing fluid suspension, or water-soluble salt. The precursor may be evaporated metal vapor, evaporated alloy vapor, a gas, a single-phase liquid, a multi-phase liquid, a melt, a sol, a solution, fluid mixtures, solid suspension, or combinations thereof. The metal-containing precursor comprises a stoichiometric or a non-stoichiometric metal composition with at least some part in a fluid phase. Fluid precursors are utilized in certain embodiments of this invention. Typically, fluids are easier to convey, evaporate, and thermally process, and the resulting product is more uniform.

In one embodiment of this invention, the precursors are environmentally benign, safe, readily available, high-metal loading, lower-cost fluid materials. Examples of metal-containing precursors suitable for purposes of this invention include, but are not limited to, metal acetates, metal carboxylates, metal ethanoates, metal alkoxides, metal octoates, metal chelates, metallo-organic compounds, metal halides, metal azides, metal nitrates, metal sulfates, metal hydroxides, metal salts soluble in organics or water, ammonium comprising compound of the metal, and metal-containing emulsions.

In another embodiment, multiple metal precursors may be mixed if complex nanoscale and submicron powders are desired. For example, a calcium precursor and a titanium precursor may be mixed to prepare calcium titanium oxide powders for electroceramic applications. As another example, a cerium precursor, a zirconium precursor, and a gadolinium precursor may be mixed in correct proportions, which could be readily determined by one of skill in the art, to yield a high purity, high surface area, mixed oxide powder for ionic device applications. In yet another example, a barium precursor (and/or zinc precursor) and a tungsten precursor may be mixed to yield powders for pigment applications. Such complex nanoscale and submicron powders can be used to create materials with surprising and unusual properties not available through the respective single metal oxides or a simple nanocomposite formed by physically blending powders of different compositions.

It is desirable to use precursors of a higher purity to produce a nanoscale or submicron powder of a desired purity. For example, if a purity greater than x % (by metal weight basis) is desired, one or more precursors that are mixed and used may have purities greater than or equal to x % (by metal weight basis) to practice the teachings herein.

With continued reference to FIG. 1, the metal-containing precursor 100 (containing one or a mixture of metal-containing precursors) is fed into a high temperature process 106, which may be implemented using a high temperature reactor, for example. In some embodiments, a synthetic aid such as a reactive fluid 108 may be added along with the precursor 100 as it is being fed into the reactor 106. Examples of such reactive fluids include, but are not limited to, hydrogen, ammonia, halides, carbon oxides, methane, oxygen gas, and air.

While the present invention provides methods of preparing nanoscale and submicron powders of oxides, the teachings may be readily extended in an analogous manner to other compositions such as carbides, nitrides, borides, carbonitrides, and chalcogenides. These compositions can be prepared from micron-sized powder precursors of these compositions or by utilizing reactive fluids that provide the elements desired in these metal comprising compositions. In some embodiments, high temperature processing may be used. However, a moderate temperature processing or a low/cryogenic temperature processing may also be employed to produce nanoscale and submicron powders using the methods of the present invention.

The precursor 100 may be pre-processed in a number of other ways before any thermal treatment. For example, the pH may be adjusted to ensure precursor stability. Alternatively, selective solution chemistry, such as precipitation with or without the presence of surfactants or other synthesis aids, may be employed to form a sol or other state of matter. The precursor 100 may be pre-heated or partially combusted before the thermal treatment.

The precursor 100 may be injected axially, radially, tangentially, or at any other angle into the high temperature region 106. As stated above, the precursor 100 may be pre-mixed or diffusionally mixed with other reactants. The precursor 100 may be fed into the thermal processing reactor by a laminar, parabolic, turbulent, pulsating, sheared, or cyclonic flow pattern, or by any other flow pattern. In addition, one or more metal-containing precursors 100 can be injected from one or more ports in the reactor 106. The feed spray system may yield a feed pattern that envelops the heat source or, alternatively, the heat sources may envelop the feed, or alternatively, various combinations of this may be employed. In some embodiments, the spray is atomized and sprayed in a manner that enhances heat transfer efficiency, mass transfer efficiency, momentum transfer efficiency, and reaction efficiency. The reactor shape may be cylindrical, spherical, conical, or any other shape. Methods and equipment such as those taught in U.S. Pat. Nos. 5,788,738, 5,851,507, and 5,984,997 (each of which is specifically incorporated herein by reference in its entirety) can be employed in practicing the methods of this invention.

In certain embodiments, the precursor feed conditions and feed equipment are engineered to favor flash boiling. Precursor may be fed utilizing any shape or size and device. Illustrative spray device include spray nozzle, tubular feed orifice, flat or bent nozzles, hollow pattern nozzle, flat or triangular or square pattern nozzle and such. In certain embodiments, a feed system that yields cavitation enhanced flash boiling are utilized for improved performance. In this regard, a useful guideline is to utilize a dimensionless number, called cavitation index (C.I.), which is defined, for purposes herein, as $$C.I. = (P_o - P_v)/\rho V^2$$

where, Po is the process pressure, Pv is the vapor pressure of the precursor in the feed nozzle, $\rho$ is the density of the precursor, V is the average velocity of the precursor at the exit of the feed nozzle (volumetric feed rate divided by cross sectional area of the feed nozzle). In certain embodiments, a negative value of cavitation index is favorable. In other embodiments, a value less than 15 for cavitation index is favorable. In yet other embodiments, a value less than 125 for cavitation index is favorable. In certain embodiments, the process pressure is maintained between 1 Torr and 10,000 Torr. In other embodiments, the process pressure is maintained between 5 Torr and 1,000 Torr. In certain embodiments, the process pressure is maintained between 10 Torr and 500 Torr. The process pressure can be maintained using any method such as, but not limiting to compressors, pressurized fluids, vacuum pumps, venturi-principle driven devices such as eductors and the like.

In case the density or the vapor pressure data for the precursor are unknown, it is recommended that they be measured by methods known in the art. Alternatively, as a useful guideline, higher feed velocities are favorable in certain embodiments. In certain embodiments, higher precursor feed temperatures are also favorable. Higher feed precursors are useful in certain embodiments wherein the precursor is viscous or becomes viscous due to flow (viscosity is greater than that of water). In certain embodiments, precursor formulations and compositions, solvents, feed spray equipment design (e.g. spray tip length, diameter, shape, surface roughness, etc.), or precursor feed parameters that lead to flash evaporation or cavitation of one or more components of the precursor stream upon spraying in the process reactor 106 (FIG. 1) are useful.

With continued reference to FIG. 1, after the precursor 100 has been fed into reactor 106, it may be processed at high temperatures to form the product powder. In other embodiments, the thermal processing may be performed at lower temperatures to form the powder product. The thermal treatment may be done in a gas environment with the aim to produce products, such as powders, that have the desired porosity, density, morphology, dispersion, surface area, and composition. This step produces by-products such as gases. To reduce costs, these gases may be recycled, mass/heat integrated, or used to prepare the pure gas stream desired by the process.

In embodiments using high temperature thermal processing, the high temperature processing may be conducted at step 106 (FIG. 1) at temperatures greater than 1500 K, in some embodiments greater than 2500 K, in some embodiments greater than 3000 K, and in some embodiments greater than 4000 K. Such temperatures may be achieved by various methods including, but not limited to, plasma processes, combustion in air, combustion in purified oxygen or oxygen-rich gases, combustion with oxidants, pyrolysis, electrical arcing in an appropriate reactor, and combinations thereof. The plasma may provide reaction gases or may provide a clean source of heat.

In certain embodiments, the high temperature is achieved by utilizing enriched oxygen or pure oxygen (or other oxidants). Adiabatic temperatures greater than 3000 K, 4000 K, or 5000 K can be achieved by utilizing purified oxygen. In certain embodiments, a low cavitation index in combination with a purified oxidant stream favors useful peak temperatures. In certain embodiments, a gas stream with greater than 25% oxygen is useful. In other embodiments, a gas stream with greater than 50% oxygen is useful. In other embodiments, a gas stream with greater than 75% oxygen is useful. In yet other embodiments, a gas stream with greater than 95% oxygen is useful. In other embodiments, a gas stream with greater than 99.5% oxygen is useful.

In some embodiments, the precursor and feed gas stream feed conditions are mixed in a ratio that favors complete evaporation of the precursor. In certain embodiments, a molar ratio of precursor to gas stream between 0.001 and 0.72 is useful. In certain embodiments, a molar ratio of precursor to gas stream between 0.01 and 0.3 is useful. In certain embodiments, a molar ratio of precursor to gas stream between 0.05 and 0.2 is useful for high temperature thermal processing. In certain embodiments, the oxygen may be added in stages thereby controlling the thermokinetic ratio of fuel and oxidant. In other embodiments, the fuel to oxidant ratio may be maintained between the upper and lower flame limits for the precursor.

The combusted precursor and oxidant stream may be further heated utilizing various thermal sources such as, but not limiting to, plasma processes (DC, RF, microwave, transferred arc, non-transferred arc, etc.), radiation, nuclear energy, etc.

In certain embodiments, a plug flow system be used. A plug flow eliminates axial mixing and thereby can yield narrow size distribution nanopowders. The design principle preferred for the design of plug flow reactor system is given by $$UL/D > \beta$$

Where,
U: axial velocity
L: axial length of the reactor
D: axial dispersion coefficient
β: plug flow index (preferably equals or more 5, more preferably equals 50 or more, and most preferably equals 500 or more)

A high temperature thermal process at 106 results in a vapor comprising elements, ionized species and/or elemental clusters. After the thermal processing, this vapor is cooled at step 110 to nucleate nanopowders. The nanoscale particles form because of the thermokinetic conditions in the process. By engineering the process conditions, such as pressure, temperature, residence time, supersaturation and nucleation rates, gas velocity, flow rates, species concentrations, diluent addition, degree of mixing, momentum transfer, mass transfer, and heat transfer, the morphology of the nanoscale and submicron powders can be tailored. It is important to note that the focus of the process should be on producing a powder product that excels in satisfying the end application requirements and customer needs.

The surface and bulk composition of the nanopowders can be modified by controlling the process temperature, pressure, diluents, reactant compositions, flow rate, addition of synthetic aids upstream or downstream of the nucleation zone, process equipment design and such. In certain embodiments, the nucleation temperature is adjusted to a temperature range wherein the condensed species is in liquid form at the process pressure. These cases, the nanomaterial product tends to take a spherical shape; thereafter the spherical nanomaterial is then cooled further to solidify. In certain embodiments, the nucleation temperature is adjusted to a temperature range wherein the condensed species is in solid form at the process pressure. In these embodiments, the nanomaterial product tends to take faceted shape, platelet shape or a shape wherein the particle's aspect ratio is greater than one. By adjustments in nucleation temperature with other process parameters, the shape, size and other characteristics of the nanomaterial can be varied.

In certain embodiments, the nanopowder comprising stream is quenched after cooling to lower temperatures at step 116 to minimize and prevent agglomeration or grain growth. Suitable quenching methods include, but are not limited to, methods taught in U.S. Pat. No. 5,788,738. In certain embodiments, sonic to supersonic processing before quenching and during quenching is useful. In certain embodiments, process stream velocities and quench velocities greater than 0.1 mach are useful (determined at 298 K and 760 Torr or any other combination of temperature and pressure). In others, velocities greater than 0.5 mach are useful. In still others, velocities greater than 1 mach are useful. Joule-Thompson expansion based quenching is useful in certain embodiments. In other embodiments, coolant gases, water, solvents, cold surfaces, or cryogenic fluids might be employed. In certain embodiments, quenching methods are employed which can prevent deposition of the powders on the conveying walls. These methods may include, but are not limited to, electrostatic means, blanketing with gases, the use of higher flow rates, mechanical means, chemical means, electrochemical means, or sonication/vibration of the walls.

In some embodiments, the high temperature processing system includes instrumentation and software that can assist in the quality control of the process. Furthermore, in certain embodiments, the high temperature processing zone 106 is operated to produce fine powders 120, in certain embodiments submicron powders, and in certain embodiments nanopowders. The gaseous products from the process may be monitored for composition, temperature, and other variables to ensure quality at step 112 (FIG. 1). The gaseous products may be recycled to be used in process 106 or used as a valuable raw material when nanoscale and submicron powders 120 have been formed, or they may be treated to remove environmental pollutants if any. Following quenching step 116, the nanoscale and submicron powders may be cooled further at step 118 and then harvested at step 120. The product nanoscale and submicron powders 120 may be harvested by any method. Suitable collection means include, but are not limited to, bag filtration, electrostatic separation, membrane filtration, cyclones, impact filtration, centrifugation, hydrocyclones, thermophoresis, magnetic separation, and combinations thereof.

The quenching at step 116 may be modified to enable preparation of coatings. In such embodiments, a substrate may be provided (in batch or continuous mode) in the path of the quenching powder containing gas flow. By engineering the substrate temperature and the powder temperature, a coating comprising the submicron powders and nanoscale powders can be formed.

In some embodiments, a coating, film, or component may also be prepared by dispersing the fine nanopowder and then applying various known methods, such as, but not limited to, electrophoretic deposition, magnetophorectic deposition, spin coating, dip coating, spraying, brushing, screen printing, inkjet printing, toner printing, and sintering. The nanopowders may be thermally treated or reacted to enhance their electrical, optical, photonic, catalytic, thermal, magnetic, structural, electronic, emission, processing, or forming properties before such a step.

It should be noted that the intermediate or product at any stage of the process described herein, or similar process based on modifications by those skilled in the art, may be used directly as a feed precursor to produce nanoscale or fine powders by methods taught herein and other methods. Other suitable methods include, but not limited to, those taught in commonly owned U.S. Pat. Nos. 5,788,738, 5,851,507, and 5,984,997, and co-pending U.S. patent application Ser. Nos. 09/638,977 and 60/310,967 which are all incorporated herein by reference in their entirety. For example, a sol may be blended with a fuel and then utilized as the feed precursor mixture for thermal processing above 2500 K to produce nanoscale simple or complex powders.

In summary, one embodiment for manufacturing powders consistent with teachings herein, comprises (a) preparing a precursor comprising at least one metal; (b) feeding the precursor under conditions wherein the cavitation index is less than 1.0 and wherein the precursor is fed into a high temperature reactor operating at temperatures greater than 1500 K, in certain embodiments greater than 2500 K, in certain embodiments greater than 3000 K, and in certain embodiments greater than 4000 K; (c) wherein, in the high temperature reactor, the precursor converts into vapor comprising the metal in a process stream with a velocity above 0.1 mach in an inert or reactive atmosphere; (d) the vapor is cooled to nucleate submicron or nanoscale powders; (e) the nucleated powders are then quenched at high gas velocities to prevent agglomeration and growth; and (f) the quenched powders are filtered from the gas suspension.

Another embodiment for manufacturing inorganic nanoscale powders comprises (a) preparing a fluid precursor comprising two or more metals, at least one of which is in a concentration greater than 100 ppm by weight; (b) feeding the said precursor into a high temperature reactor with a negative cavitation index; (c) providing an oxidant such that the molar ratio of the precursor and oxidant is between 0.005 and 0.65; (d) wherein the precursor and oxidant are heated to a temperatures greater than 1500 K, in some embodiments greater than 2500 K, in some embodiments greater than 3000 K, and in some embodiments greater than 4000 K in an inert or reactive atmosphere; (e) wherein, in the said high temperature reactor, the said precursor converts into vapor comprising the metals; (f) the vapor is cooled to nucleate submicron or nanoscale powders (in some embodiments, at a temperature where the condensing species is a liquid; in other embodiments, at a temperature where the condensing species is a solid); (g) in some embodiments, providing additional time to let the nucleated particles grow to a desired size, shape and other characteristics; (h) the nucleated powders are then quenched by any technique to prevent agglomeration and growth; and (i) the quenched powder comprising stream is processed to separate solids from the gases. In certain embodiments, the fluid precursor may include synthesis aids such as surfactants (also known as dispersants, capping agents, emulsifying agents, etc.) to control the morphology or to optimize the process economics and/or product performance.

One embodiment for manufacturing coatings comprises (a) preparing a fluid precursor comprising one or more metals; (b) feeding the said precursor at negative cavitation index into a high temperature reactor operating at temperatures greater than 1500 K, in some embodiments greater than 2500 K, in some embodiments greater than 3000 K, and in some embodiments greater than 4000 K in an inert or reactive atmosphere; (c) wherein, in the high temperature reactor, the precursor converts into vapor comprising the metals; (d) the vapor is cooled to nucleate submicron or nanoscale powders; (e) the powders are then quenched onto a substrate to form a coating on a surface to be coated.

The powders produced by teachings herein may be modified by post-processing as taught by commonly owned U.S. patent application Ser. No. 10/113,315, which is hereby incorporated by reference in its entirety.

Methods for Manufacturing Nanomaterial Dispersions

In certain embodiments, once nanoparticles of desired composition and characteristics are available, they are first deagglomerated such that the mean size of the agglomerate is equal to or less than twenty times (in certain embodiments equal to or less than ten times, in certain embodiments equal to or less than five times, and in certain embodiments equal to or less than three times) the primary particle (crystallite) size as determined by Warren-Averbach analysis of X-ray spectra for the particles. The deagglomerated powders are then optionally treated to either remove surface adsorbed species or add surface species or both. Methods for such treatment include, but are not limited to, one or more of the following (a) heat treatment at high pressures, ambient pressures and vacuum using inert, oxidizing or reducing atmospheres; (b) chemical treatment at suitable pressures, temperatures, times, and fluid phases; (c) mechanical treatment such as those in milling, microchannels, homogenizers, and any method of applying fluid dynamic effects in general and shear forces in particular. Such treatments are useful and help ease the dispersion of nanoparticles and engineer the characteristics of the dispersions including those based on water, organic solvents, inorganic solvents, melts, resins, monomers, any type of fluid and such. Other methods of treatment would be obvious and readily available to one of ordinary skill in the art and may be employed depending on the results desired.

In some embodiments, heat treatment of nanopowders may be at temperatures less than 75% of the melting point of the substance, in other embodiments at temperatures less than 50% of the melting point of the substance, and in still further embodiments at temperatures less than 25% of the melting point of the substance. If the melting point is unknown or as a generic guideline, the heat treatment may be done between 100 to 400° C. and in other embodiments between 175 to 300° C. under air or gas flow. In certain embodiments, the heat treatment may be done between 400 to 800° C. and in other embodiments between 750 to 1200° C. under air flow or gas flow. The heat treatment may be done in vacuum, ambient pressure, or under pressure or under supercritical conditions, in air, pure oxygen, carbon dioxide, nitrogen, argon, hydrogen containing, inert, halogen containing, organic vapor containing, or other suitable chemical environments. It is to be noted that in certain embodiments, the melting point of the nanoparticle is surprisingly lower than the melting of coarse powder of the same composition.

If chemical treatment is employed, the chemical environment of the treatment media may be monitored and refreshed appropriately to reflect the changes in the media from the reaction products. Specific illustration of the media properties that can be monitored depends on the fluid phase and can optionally include one or more of the following—pH, temperature, zeta potential, conductivity, flocculate size, optical absorption characteristics, nanoparticle loading, chemical composition. In certain embodiments, the chemical treatment of nanoparticles is done between a pH of about 0.5 and about 13, in certain embodiments between a pH of 2 to 5, and in certain embodiments it is done between a pH of 8 and 11.

The deagglomerated and surface treated nanoscale powders are then mixed with and partially or fully dispersed into a suitable solvent. Illustration of suitable solvents include, but are not limited to, regular or high purity water, methanol, ethanol, iso-propyl alcohol, octane, dodecane, heptane, hexane, acetone, gasoline, DOWANOL® solvents and compositions corresponding to these solvents, glycols, glycerol, phenol, acetates, polyurethanes, acrylates, epoxies, aliphatic hydrocarbons, aromatic hydrocarbons, alcohols, aldehydes, ketones, ethers, acids, amines, quarternary compounds, alkalis, terpenols, liquids with boiling point greater than 400 K, UV curable liquids, plasma curable liquids, heat curable liquids, ionic liquids, molten polymers, molten metals, monomers, oils, silicones, ethylene glycol, diethylene glycol, ethanolamine, formic acid, acetonitrile, 1-propyl alcohol, acetic acid, 2-ethoxy ethanol, anhydrous isopropanol, DMSO, 1-butyl alcohol, tetrahydro furfuryl alcohol, n,n-dimethyl acetamide, diacetone alcohol, 2-methyl butanol, n-pentanol, acetone, 2-(2-butoxy ethoxy) ethanol, UCAR® Filmer IBT, cellosolve acetate, methotate, isophorone, methylethyl ketone, tetra hydrofuran, aniline, pyridine, methyl n-propyl ketone, UCAR® Ester EEP, UCAR® n-propyl propionate, primary amyl acetate, methyl isobutyl ketone, isobutyl acetate, UCAR® n-butyl propionate, n-butyl acetate, methyl isoamyl ketone, diisobutyl ketone, chloroform, 1,4 dioxane, trichloroethane, hydrochlorocarbons, hydrofluorocarbons, xylene, toluene, benzene, cyclohexane, hexane, carbon disulfide, carbon tetrachloride, methylene chloride, dimethylene chloride, n-butyl glycolate, glycolic acid, methyl glycolate, ethyl lactate, ethyl glycolate, ethylenediamine, butyrolactone, n-octanol, iso-octanol, gasoline, diesel, kerosene, jet fuel, m-cresol, phenol, biofluids, plant sap, alphahydroxy compounds, sea water, mineral oils, milk, fruit juices, plant-derived oils, seed-derived oils or extracts, the like and combinations thereof. The mixing step can be accomplished by any technique. Illustrations of mixing techniques include, but are not limited to, stirring, sonication, sparging, milling, shaking, centrifugal circulating pump mixing, blade mixing, impact mixing, jet mixing, homogenization, co-spraying, fluid flow through channels with dimensions less than 1000 microns (in certain embodiments less than 250 microns, in certain embodiments less than 100 microns, and in certain embodiments less than 100 times the mean particle size of the powders). In certain embodiments, high to very high shear rates (tip speeds greater than 25 fps in some embodiments, greater than 50 fps in some embodiments, and greater than 100 fps in other embodiments; achieving shear rates greater than or much greater than 25,000 $sec^{-1}$) applied over short periods of time can lead to superior dispersions. In certain embodiments, very high or very low shear rates may lead to agglomeration; in these cases, appropriate moderate shear rates can be empirically discovered and practiced. The dispersion manufacturing steps and process may be automated with computers and software to achieve superior reproducibility and to lower variability.

In certain embodiments, the solvent composition comprising one or more solvents, non-limiting illustrations of which have been provided above, is selected using Hansen solubility parameters. In these embodiments, the Hansen parameters, namely non-polar (dispersive) component, polar component and hydrogen bonding component of the solubility parameter for the solvents and the fine powder are determined and then that solvent composition is chosen wherein the relative contribution of Hansen parameters for the solvent composition and the desired fine powder match or are closer to each other than the other alternative solvent composition. This insight can also be used when a resin or polymer matrix is being selected for a nanomaterial composition, or vice versa.

The Hansen parameters are related to Hildebrand solubility parameter per the equation (Hildebrand parameter, $\delta_t$)$^2$=(Hansen non-polar dispersion component, $\delta_{np}$)$^2$+(Hansen polar component, $\delta_p$)$^2$+(Hansen hydrogen bonding component, $\delta_h$)$^2$ Most large volume manufacturers of solvents such as Dow Chemicals®, DuPont®, Eastman®, BASF®, Ashland®, Bayer® and others determine and list all three Hansen parameters for the solvent they offer. These listed values may be used as described herein. In case of new solvents or other fluids or fluid-like compositions of matter, the numerical values for the Hansen component parameters may be empirically established or theoretically estimated by methods known in the art. For example, the Hansen parameters may be determined in the following way: First, the dispersion force for a particular solvent is calculated using the homomorph method. The homomorph of a polar molecule is the nonpolar molecule most closely resembling it in size and structure (n-butane is the homomorph of n-butyl alcohol). The Hildebrand value for the nonpolar homomorph (being due entirely to dispersion forces) is assigned to the polar molecule as its dispersion component value. This dispersion value (squared) is then subtracted from the Hildebrand value (squared) of the liquid, the remainder designated as a value representing the total polar plus hydrogen bonding interaction of the molecule. Through trial and error experimentation and comparison with known solvents, one may separate the polar value into polar and hydrogen bonding component parameters best reflecting empirical evidence. For fine powders (and nanomaterials), similar techniques may be utilized or the Hansen parameter value may be estimated based on empirical search and match aided by a matrix of solvent and/or polymer compositions and instruments that measure particle characteristics such as crystallite size, particle size, size distribution, light absorption, light reflection, light scattering, surface area, dielectric radii, and the like. The techniques used to determine Hansen parameters for solvents and polymers can be extended and used for determining the Hansen parameters for nanomaterials.

For certain embodiments herein, a solvent composition with the following parameters is selected 30 $(cal/cm^3)^{1/2} \leq \delta_{np} \leq 100(cal/cm^3)^{1/2}$, $0 \leq \delta_p \leq 50$ $(cal/cm^3)^{1/2}$, $0 \leq \delta_h \leq 50$ $(cal/cm^3)^{1/2}$ In other embodiments herein, a solvent composition with the following parameters is selected 10 $(cal/cm^3)^{1/2} \leq \delta_{np} \leq 100$ $(cal/cm^3)^{1/2}$, $0 \leq \delta_p \leq 50$ $(cal/cm^3)^{1/2}$, $0 \leq \delta_h \leq 50$ $(cal/cm^3)^{1/2}$ For a specific fine powder composition or nanomaterial composition (with composition's Hansen parameters given by $\delta^*_{np}$, $\delta^*_p$, and $\delta^*_h$) and a solvent composition (with Hansen parameters given by $\delta^s_{np}$, $\delta^s_p$, and $\delta^s_h$) for dispersing the nanomaterial composition is selected as follows. First the percentage contribution of each Hansen parameter for the powder composition is calculated. Next, the percentage contribution of each Hansen parameter for the various solvent compositions is calculated. Then, the Hansen interface match index (HIMI) is calculated as follows $$HIMI = SQRT((\delta^*_{np}/D^* - \delta^s_{np}/D^s)^2 + (\delta^*_p/D^* - \delta^s_p/D^s)^2 + (\delta^*_h/D^* - \delta^s_h/D^s)^2)/0.01$$

Where,

SQRT: is square root, a mathematical function $D^* = \delta^*_{np} + \delta^*_p + \delta^*_h$ (calculated in $(cal/cm^3)^{1/2}$)

$D^s = \delta^s_{np} + \delta^s_p + \delta^s_h$ (calculated in $(cal/cm^3)^{1/2}$)

A solvent with each percentage contribution values closest to the respective percentage contribution of fine powder is selected. In certain embodiments, the Hansen interface match index is less than 25, in other embodiments it is less than 10, in yet other embodiments it is less than 5, and in other embodiments it is less than 1. To illustrate, if the percentage contribution values for the Hansen parameters of a nanomaterial is given by—non-polar 40%, polar 20% and hydrogen bonding component of 40%, a solvent composition with the following percentage contributions would be selected for dispersing the nanomaterials, in certain embodiments—non-polar 35%-45%, polar 14%-26%, hydrogen bonding 30%-50%. As another non-limiting illustration, we have determined that titanium comprising nanomaterials (e.g. aluminum oxide) have Hansen parameters such that a solvent composition with the following percentage contributions would be suitable for dispersing aluminum comprising nanomaterials, in certain embodiments—non-polar 33%-49%, polar 11%-29%, hydrogen bonding 28-47%. As another non-limiting illustration, we have determined that iron comprising nanomaterials (e.g. ferrites, iron oxide and the like) have Hansen parameters such that a solvent composition with the following percentage contributions would be suitable for dispersing iron comprising nanomaterials, in certain embodiments—non-polar 40%-63%, polar 14%-33%, hydrogen bonding 14-41%. As another non-limiting illustration, we have determined that titanium comprising nanomaterials (e.g. anatase or rutile titania and the like) have Hansen parameters such that a solvent composition with the following percentage contributions would be suitable for dispersing titanium comprising nanomaterials, in certain embodiments—non-polar 31%-53%, polar 12%-33%, hydrogen bonding 27-43%. As another non-limiting illustration, we have determined that zirconium comprising nanomaterials (e.g. zirconia, yttria stabilized zirconia, gadolinium doped zirconium compound and the like) have Hansen parameters such that a solvent composition with the following percentage contributions would be suitable for dispersing zirconium comprising nanomaterials, in certain embodiments—non-polar 68%-91%, polar 12%-31%, hydrogen bonding 9-28%.

In certain embodiments, at least two or more solvents give surprisingly improved dispersion characteristics and are utilized to formulate the dispersion. In certain embodiments, resins, monomers, solutes, additives and other substances may be added to give surprisingly improved dispersion characteristics and are utilized to formulate the dispersion. The choice of additional solvents, resins, monomers, solutes, additives and other substances can also be guided by Hansen interface match index discussed herein. Each Hansen parameter of a solvent composition that comprises two or more solvents can be calculated by multiplying the volume fraction of each solvent with the respective Hansen parameter for each solvent and adding these up. In a generic way, the following equations work as a good guideline $\delta_{np, mix} = \Sigma(\text{volume fraction} * \delta_{np})_{each\ solvent}$ $\delta_{p, mix} = \Sigma(\text{volume fraction} * \delta_p)_{each\ solvent}$ $\delta_{h, mix} = \Sigma(\text{volume fraction} * \delta_h)_{each\ solvent}$ As discussed for single solvents earlier, in a mixture of solvents too, a solvent composition is chosen wherein the relative contribution of all three Hansen parameters for the solvent composition and those of the desired fine powder match (i.e. choose the solvent composition mix wherein the Hansen Interface Match Index is equal to zero) or almost match or the difference is less than the other alternative solvent composition. In certain embodiments wherein two or more solvents and/or resins, monomers, solutes, additives and other substances are utilized, the Hansen interface match index between the nanomaterial and the mix composition is less than 50, in other embodiments it is less than 20, in yet other embodiments it is less than 10, and in other embodiments it is less than 2.5.

In certain embodiments, the fine powders are first washed with a solvent composition whose Hansen Interface Match Index is close to that of the fine powders prior to dispersing the fine powders in a different solvent or resin or monomer or polymer or any other matrix. A non limiting illustration of this embodiment is washing a metal oxide nanoparticles with acetic acid prior to dispersing it in isopropanol or acetonitrile or DOWANOL® PM or a mixture of one of more of these or other solvents. In yet other embodiments, the nanomaterial may be surface treated such that the species present on the surface in adsorbed or chemically bonded form is removed, replaced, introduced and/or modified. Surface treatment can be used to modify the surface of the nanomaterial (or fine powder) so that the Hansen interface match index of the surface modified nanomaterial and solvent composition (or resin or polymer or matrix) of interest matches (equal to zero) or is less than a value of 30. The surface treatment (or functionalization) of the nanomaterial may be performed prior to the dispersion step or in situ while the dispersion is being prepared. In some embodiments the species present on the surface in adsorbed or chemical bonded form may be a nitrogen comprising species. In some embodiments the species present on the surface in adsorbed or chemical bonded form may be an oxygen comprising species. In some embodiments, the species present on the surface in adsorbed or chemical bonded form can comprise carbon, silicon, chalcogen, a halogen, or a hydroxyl. In some embodiments the species present on the surface in adsorbed or chemical bonded form may be a combination of two or more species.

In certain other embodiments, the fine powders are first processed with a vapor comprising a solvent composition whose Hansen Interface Match Index is close to that of the fine powders prior to dispersing the fine powders in a desired solvent, resin, monomer, polymer, or any other matrix. The processing may be done in one or more of the following—a fluidized bed, a furnace, a bed, a conveyor, a mixer, a jet mill, a calciner, a rotary bed, trays, a kiln, a deposition unit and the like. A non-limiting illustration of this embodiment is contacting metal oxide nanoparticles in a calciner with ketone vapor prior to dispersing it in a solvent mixture of isopropanol and water.

In certain embodiments, the dispersion manufacturing step includes filtration. The filters may be constructed of polypropylene, Teflon®, cellulose, polymeric, silicon-based, porous ceramic, porous metal, anodized porous substrate, porous carbon, porous wood, membrane or other media. The filters may be uniform or may employ gradient structure of pores. The term "filter rating" of a filter depends on the pore size, pore size distribution and pore arrangement; the term refers to the maximum particle size in the dispersion that passes through the filter into the filtrate. In certain embodiments, filters with a filter rating less than 3 microns are employed. In certain embodiments, filters with a filter rating less than 1 micron are employed. In certain embodiments, filters with a filter rating less than 0.5 micron are employed. In certain embodiments, filters with a filter rating less than 250 nanometers are employed. In certain embodiments, filters with a filter rating less than 100 nanometers are employed. In certain embodiments, the gradient structure of the filters may be used wherein the gradient refers to reducing the average diameter of the filter pores in the direction of flow. In other embodiments, a multi-layered structure of filters may be used wherein the layered structure has a reducing average diameter of the filter pores as one proceeds through layers in the direction of flow. In other embodiments, multiple filters may be used in series wherein coarser filters precede the filters with filter rating for smaller particle size. The filters may be regenerated, activated, or pressurized. The filters may be in-line filters or of other configurations. The filters may be backflushable, disposable, or washable. Filters can be used by any methods known to the filtration community. For example, the filters may be used in combination with pumps wherein the pump pressurizes the dispersion and causes it to flow through the filter. In applications where upper particle limits are desired, filtration is particularly useful. In some embodiments, a dispersion prepared in accordance with these teachings, 99% of the particle size ($d_{99}$) by volume as measured by photocorrelation spectroscopy (or other techniques) are less than 1000 nanometers. In certain embodiments, a dispersion prepared in accordance with these teachings, 99% of the particle size ($d_{99}$) by volume as measured by photocorrelation spectroscopy (or other techniques) are less than 500 nanometers. In other embodiments, a dispersion prepared in accordance with these teachings, 99% of the particle size by volume as measured by photocorrelation spectroscopy are less than 250 nanometers. In yet other embodiments, a dispersion prepared in accordance with these teachings, 99% of the particle size by volume as measured by photocorrelation spectroscopy are less than 100 nanometers. In other embodiments, a nanomaterial dispersion prepared in accordance with these teachings, 99% of the particle size by volume as measured by photocorrelation spectroscopy are less than 50 nanometers. In some embodiments, a dispersion prepared in accordance with these teachings, the median aggregate diameter as measured by photocorrelation spectroscopy (or other techniques) is less than 750 nanometers. In certain embodiments, a dispersion prepared in accordance with these teachings, median aggregate diameter as measured by photocorrelation spectroscopy (or other techniques) is less than 400 nanometers. In other embodiments, a dispersion prepared in accordance with these teachings, median aggregate diameter as measured by photocorrelation spectroscopy (or other techniques) is less than 200 nanometers. In yet other embodiments, a dispersion prepared in accordance with these teachings, median aggregate diameter as measured by photocorrelation spectroscopy (or other techniques) is less than 100 nanometers. In other embodiments, a nanomaterial dispersion prepared in accordance with these teachings, median aggregate diameter as measured by photocorrelation spectroscopy (or other techniques) is less than 50 nanometers.

In certain embodiments wherein the dispersion (e.g. ink) needs to dry fast, lower boiling and high vapor pressure solvents are generally recommended. Additionally, additives that assist drying by oxidation may be added to the dispersion. Illustrative examples of such additives include, but are not limited to, soaps of metals such as manganese, cobalt, and other metals with organic acids. If it were important to prevent or slow down the drying of a dispersion with time, low vapor pressure solvents or ionic liquids may be used. Premature oxidation of inks may be retarded by adding antioxidants such as ionol, eugenol, and other compounds.

Additional additives may be added to modify the characteristics of a nanoparticulate ink. For example, waxes may be added to improve slip resistance, scuff resistance, or modify the rheology. Lubricants, defoamers, surfactants, thickeners, preservatives, biocides, dyes, commercially available ink vehicles, catalysts and gellants may be added to achieve a combination of properties needed by the end application. For dispersion stability, salts and pH modifiers may be used. One of ordinary skill in the art may readily choose additional additives depending on the desired characteristics of the nanoparticulate ink.

The dispersability of the nanoparticles is enhanced in certain embodiments by treating the surface of the metal oxide powders or other metal comprising nanoparticles. This treatment, in some embodiments, is mixing the powders with surfactants of various kinds and different hydrophil lyophil balance (HLB) indices; HLB may be between 1 to 30 or higher. The treatment, in some embodiments, involves coating the particles with another substance such as oxide, carbide, polymer, nitride, metal, boride, halide, salt, sulfate, nitrate, chalcogenides and the like. For example, fatty acids (e.g. propionic acid, stearic acid and oils) can be applied to or with the nanoparticles to enhance the surface compatibility. If the powder has an acidic surface, ammonia, quaternary salts, or ammonium salts can be applied to the surface to achieve desired surface pH. In other cases, acetic acid wash can be used to achieve the desired surface state. Trialkyl phosphates and phosphoric acid can be applied to reduce dusting and chemical activity. In some embodiments, a solvent composition is warmed or chilled prior to and/or during its use for washing or dispersing nanomaterials (or fine powders). In certain embodiments, to illustrate, the temperature of the solvent composition, resin, monomer, or polymer is maintained a temperature between 100 K to 1500 K at low or high pressures (with or without the presence of a radiation) while processing the nanomaterial and/or formulating a dispersion with the nanomaterial.

For systematic development and manufacturing of the dispersion, the particle size distribution, dispersion's zeta potential, pH and conductivity may be monitored and modified using manual or computer controlled instruments. It should be noted that the various embodiments discussed herein can be applied in isolation or in combination; when applied in combination, they may be applied in different sequence and order to get improved dispersion and products. To illustrate, nanomaterials may be first heat treated, next washed with solvent of first composition and then dispersed in solvent of second composition in one embodiment; while in another embodiment, they may be first washed with solvent of first composition, then heat treated and then dispersed in solvent of second composition. They may be dispersed first and then deagglomerated in one embodiment, while in another embodiment they are deagglomerated first and then dispersed. Numerous additional combinations of such embodiments feasible from teachings herein would be apparent to those skilled in the art.

Uses of Nanomaterial Dispersions

In certain embodiments, a paste or concentrate is formed by mixing the fine powder in a solvent composition wherein the fine powder loading is greater than 25% by weight, in certain embodiments greater than 40% by weight, in certain embodiments greater than 55% by weight, in certain embodiments greater than 75% by weight; in other embodiments, the Hansen Interface Match Index between the fine powder and the solvent composition used to prepare the concentrate is less than 50, in other embodiments it is less than 20, in yet other embodiments it is less than 10, and in other embodiments it is less than 2.5. Broadly, the solvent composition used to prepare nanomaterial concentrates can be any; some non-limiting illustrations include one or more of the following substances—organic solvents, inorganic solvents, aqueous solvents, monomers, polymers, solutions, oxygen comprising compositions, chalcogenides comprising compositions, boron comprising compositions, phosphorus comprising compositions, halogen comprising compositions, nitrogen comprising compositions, metal comprising compositions, carbon comprising compositions, molten metals and alloys, molten salts, supercritical fluids, liquids, oils, or gels which are synthetic or derived from nature such as agriculture or fishes or trees or fruits or seeds or flora or fauna; the fluid or fluid-like phase included within the scope are water, acids, alkalis, organic melts, monomers, polymers, oligomers, biological fluids, ethers, esters, aromatics, alkanes, alkenes, alkynes, alcohols, aldehydes, ketones, carboxylic acids, organometallics, terpenols, acetates, sulfonic acids, emulsions, mixture of two or more liquid compositions, solutions, and the like.

The taught nanomaterial concentrates and pastes are useful in preparing paints, coatings, adhesives, films, tapes, densified parts, composites, devices and other products. The particular usefulness of such concentrates is for reasons such as the following—(a) nanomaterials have low apparent bulk density (tap density) and often require large volumes to store and transport which increases the costs; nanomaterial concentrates have significantly higher bulk density and nanomaterial concentrates therefore need much lower volumes for storage and transportation. Nanomaterial concentrates offer bulk densities that are 3 times or more the bulk density of dry nanomaterials in some embodiments (which can reduce the storage and transportation volume required by the concentrate to less than half required for storing dry nanomaterial), while in other embodiments the bulk density increase is over 10 times the bulk density of dry nanomaterials. This significantly reduces logistical costs and reduces the cost of transporting goods; (b) certain nanomaterials have a tendency of becoming air borne or water borne in a dry form. In certain clean room environments, clean environments and in certain shipping routes, there is a need to find ways to eliminate the risk of certain nanomaterials from becoming airborne or released to environment. Nanomaterial concentrates eliminate this risk because the nanomaterials are now contained because of cohesive forces inherent within the concentrate; (c) nanomaterials can be difficult be add to a processing step or consolidate; nanomaterial concentrates are easier and cheaper to process and consolidate into useful devices and products. The nanomaterial concentrate taught herein offer these and other advantages. To illustrate but not limit, a useful nanomaterial concentrate that is more economical to transport is formed by dispersing the nanomaterial in a solvent composition wherein the nanomaterial content is 60% by weight in certain embodiments. To illustrate again but not limit, a useful nanomaterial concentrate that is more economical to transport is formed by dispersing the nanomaterial in a solvent composition wherein the nanomaterial content is at least 60% by weight and wherein the solvent composition selected for preparing the nanomaterial concentrate has a Hansen Interface Match Index value less than 7.5 with the nanomaterial. To illustrate further but not limit, a useful metal oxide nanopowder concentrate is formed by dispersing the nanomaterial in a ketone comprising liquid composition wherein the nanomaterial content is 30% by weight and wherein the ketone comprising composition selected for preparing the nanomaterial concentrate has a Hansen Interface Match Index value less than 25 with the nanomaterial. To illustrate further but not limit, a useful non-oxide nanopowder concentrate composition of matter is formed (that is inherently less prone to accidental release to air) by dispersing the nanomaterial in ammonia comprising liquid composition wherein the nanomaterial content is 40% by weight and wherein the ammonia comprising composition selected for preparing the nanomaterial concentrate has a Hansen Interface Match Index value less than 35 with the nanomaterial. To illustrate further but not limit, a useful dielectric multimetal oxide nanopowder concentrate composition of matter is formed (that is easier to process into device layers) by dispersing the nanomaterial in an oxygen comprising solvent composition wherein the nanomaterial content is 50% by weight and wherein the oxygen comprising composition selected for preparing the nanomaterial concentrate has a Hansen Interface Match Index value less than 10 with the nanomaterial. To illustrate further but not limit, a useful high refractive index chalcogenide nanopowder concentrate composition of matter is formed (that is easier to process into coatings) by dispersing the nanomaterial in an polymer comprising composition wherein the nanomaterial content is 25% by weight and wherein the polymer comprising composition selected for preparing the nanomaterial concentrate has a Hansen Interface Match Index value less than 35 with the nanomaterial. To illustrate further but not limit, a useful conducting metal nanopowder concentrate composition of matter is formed (that is easier to process into electrodes) by dispersing the nanomaterial in an inorganic or UV curable comprising composition wherein the nanomaterial content is 35% by weight and wherein the inorganic or UV curable comprising composition selected for preparing the nanomaterial concentrate has a Hansen Interface Match Index value less than 15 with the nanomaterial.

Applications for dispersions and concentrates provided by this invention include structural components, ceramic parts, ceramic matrix composites, carbon matrix composites, polymer matrix composites, coatings, polishing slurries, gaskets, polymer, or composite seals.

An additional application of the teachings herein is functionally graded parts or components that are dense or porous. Illustration includes a filter with a porosity gradient through the thickness. The invention provided here have application in the biomedical field, among other fields. For example, the present invention may be applied to producing implant materials, monitors, sensors, drug concentrates, water soluble polymers, drug delivery devices, and biocatalysts from nanoscale powders using the multi-layer laminating process to produce three-dimensional shapes.

This invention may also be applied the solid oxide fuel cell (SOFC) area. Zirconia is one of the materials that has been investigated as the solid electrolyte for SOFC's. Solid electrolyte components can be made by tape casting multi-layer devices from nanomaterial dispersions (i.e., nanomaterial based electrolytes).

Additionally, nanopowder dispersions made in accordance with the present invention are useful for producing electrical devices such as varistors, inductors, capacitors, batteries, EMI filters, interconnects, resistors, thermistors, and arrays of these devices from nanoscale powders. Moreover, magnetic components such as giant magnetoresistive GMR devices may be manufactured from nanoscale powders dispersion produced in accordance with the present invention as well as in the manufacture thermoelectric, gradient index optics, and optoelectronic components from nanoscale powders dispersions or concentrates.

The teachings in this invention are contemplated to be useful in preparing any commercial product from nanoscale powders where performance is important or that is expensive to produce or is desired in large volumes. Moreover, fine powder dispersions have numerous applications in industries such as, but not limiting to biomedical, pharmaceuticals, sensor, electronic, telecom, optics, electrical, photonic, thermal, piezo, magnetic, catalytic and electrochemical products. Table 1 presents a few exemplary non-limiting applications of nanomaterial dispersions.

TABLE 1

| Application | Useful Nanomaterial Dispersion |
|---|---|
| Capacitors, Resistors, Inductors, Integrated Passive Components | Barium titanate, strontium titanate, barium strontium titanates, silicates, yttria, zirconates, nanodopants, fluxes, electrode formulations |
| Substrates, Packaging | Alumina, aluminum nitride, silicon carbide, cordierite, boron carbide, composites |
| Piezoelectric transducers | PZT, barium titanate, lithium titanates, nanodopants |
| Magnets | Ferrites, cobaltates, borides, nitrides, high temperature superconductors |
| Electrodes, Antennas | Copper, silver, gold, palladium, platinum, precious metal alloys, bronzes, soldering compositions, ITO, ATO, non-stoichiometric oxides |
| Electroptics | (Pb,La)(Zr,Ti)$O_3$, nanodopants |
| Insulators | Alumina, silicates |
| Varistors | ZnO, titania, titanates, nanodopants |
| Thermistors | Barium titanates, mangnates, nanodopants |
| Fuel Cells | Zirconia, ceria, stabilized zirconia, interconnects materials, electrodes, bismuth oxide, doped ceria, perovskites, PEM, Nafion ®, nanodopants |
| Mechanical components, sealants, adhesives, gaskets, sporting goods, structural components | Silicon nitride, zirconia, titanium carbide, titanium nitride, titanium carbonitride, boron carbide, boron nitride, dispersion strengthened alloys |

TABLE 1-continued

| Application | Useful Nanomaterial Dispersion |
|---|---|
| Biomedical | Aluminum silicates, alumina, hydroxyapatite, zirconia, zinc oxide, copper oxide, titania |
| Coatings | Indium tin oxide, nanostructured non-stoichiometric oxides, titania, titanates, silicates, chalcogenides, zirconates, zirconia, alumina, silicates, tungsten oxide, doped oxides, concentric coated oxides, copper oxide, magnesium zirconates, chromates, oxynitrides, nitrides, carbides, cobalt doped titania, borides |
| Pigments | Oxynitrides, titania, zinc oxide, zirconium silicate, zirconia, doped oxides, transition metal oxides, rare earth oxides, multimetal oxides, nitrides, borides |
| Engineered plastics | Silicates, zirconates, manganates, aluminates, borates, barytes, nitrides, carbides, borides, multimetal oxides |
| Catalysts | Aluminum silicates, alumina, mixed metal oxides, zirconia, metal doped oxides, zeolites |
| Abrasives, Polishing Media | Aluminum silicates, zirconium silicates, alumina, ceria, zirconia, copper oxide, tin oxide, zinc oxide, multimetal oxides, silicon carbide, boron carbide, diamong, tungsten carbide, nitrides, titania |

Other embodiments of the invention will be apparent to those skilled in the art from a consideration of the specification or practice of the invention disclosed herein. It is intended that the specification and examples be considered as exemplary only, with the true scope and spirit of the invention being indicated by the claims.

What is claimed is:

1. A concentrated dispersion comprising a nanomaterial and a solvent composition;
   wherein a Hansen interface match index between the nanomaterial and the solvent composition is less than 50,
   wherein the bulk density of the concentrated dispersion is at least three times higher than the bulk density of the nanomaterial in dry form,
   wherein the concentrate requires less volume to store and transport over that required for dry nanomaterial,
   wherein the nanomaterial loading in the concentrated dispersion is at least 55% by weight, and
   wherein the solvent composition has percentage contribution values for Hansen parameters that are selected from one of the following four combinations: 1) non-polar 33%-49%, polar 11%-29%, and hydrogen bonding 28%-47%; 2) non-polar 40%-63%, polar 14%-33%, and hydrogen bonding 14%-41%; 3) non-polar 31%-53%, polar 12%-33%, and hydrogen bonding 27%-43%; or 4) non-polar 68%-91%, polar 12%-31%, and hydrogen bonding 9%-28%.

2. The concentrated dispersion of claim 1, wherein the nanomaterial is an oxide.

3. The concentrated dispersion of claim 1, wherein the nanomaterial is a metal.

4. The concentrated dispersion of claim 1, wherein the nanomaterial is a non-oxide.

5. The concentrated dispersion of claim 1, wherein the solvent composition comprises an organic solvent.

6. The concentrated dispersion of claim 1, wherein the solvent composition comprises an inorganic solvent.

7. The concentrated dispersion of claim 1, wherein the nanomaterial loading in the concentrated dispersion is at least 60% by weight.

8. The concentrated dispersion of claim 1, wherein the Hansen interface match index between the nanomaterial and the solvent composition is less than 25.

9. The concentrated dispersion of claim 1, wherein the Hansen interface match index between the nanomaterial and the solvent composition is less than 10.

10. The concentrated dispersion of claim 1, wherein the Hansen interface match index between the nanomaterial and the solvent composition is less than 1.

11. The concentrated dispersion of claim 1, wherein the nanomaterial comprises an oxide, the solvent composition comprises a ketone, and the Hansen interface match index between the nanomaterial and the solvent composition is less than 25.

12. The concentrated dispersion of claim 1, wherein the nanomaterial comprises a multimetal oxide, the solvent composition comprises oxygen, and the Hansen interface match index between the nanomaterial and the solvent composition is less than 10.

13. The concentrated dispersion of claim 1, wherein the nanomaterial comprises tungsten oxide.

14. A concentrated dispersion consisting essentially of a nanomaterial and a solvent composition;
wherein a Hansen interface match index between the nanomaterial and the solvent composition is less than 50,
wherein the bulk density of the concentrated dispersion is at least three times higher than the bulk density of the nanomaterial in dry form,
wherein the concentrate requires less volume to store and transport over that required for dry nanomaterial,
wherein the nanomaterial loading in the concentrated dispersion is at least 55% by weight, and
wherein the solvent composition has percentage contribution values for Hansen parameters that are selected from one of the following four combinations: 1) non-polar 33%-49%, polar 11%-29%, and hydrogen bonding 28%-47%; 2) non-polar 40%-63%, polar 14%-33%, and hydrogen bonding 14%-41%; 3) non-polar 31%-53%, polar 12%-33%, and hydrogen bonding 27%-43%; or 4) non-polar 68%-91%, polar 12%-31%, and hydrogen bonding 9%-28%.

15. The concentrated dispersion of claim 13, wherein the solvent composition has percentage contribution values for Hansen parameters of non-polar 33%-49%, polar 11%-29%, and hydrogen bonding 28%-47%.

16. The concentrated dispersion of claim 13, wherein the solvent composition has percentage contribution values for Hansen parameters of non-polar 31%-53%, polar 12%-33%, and hydrogen bonding 27%-43%.

* * * * *